(No Model.)
J. PETTINGER.
COMBINED SHAFTS AND POLE FOR VEHICLES.
No. 316,651. Patented Apr. 28, 1885.
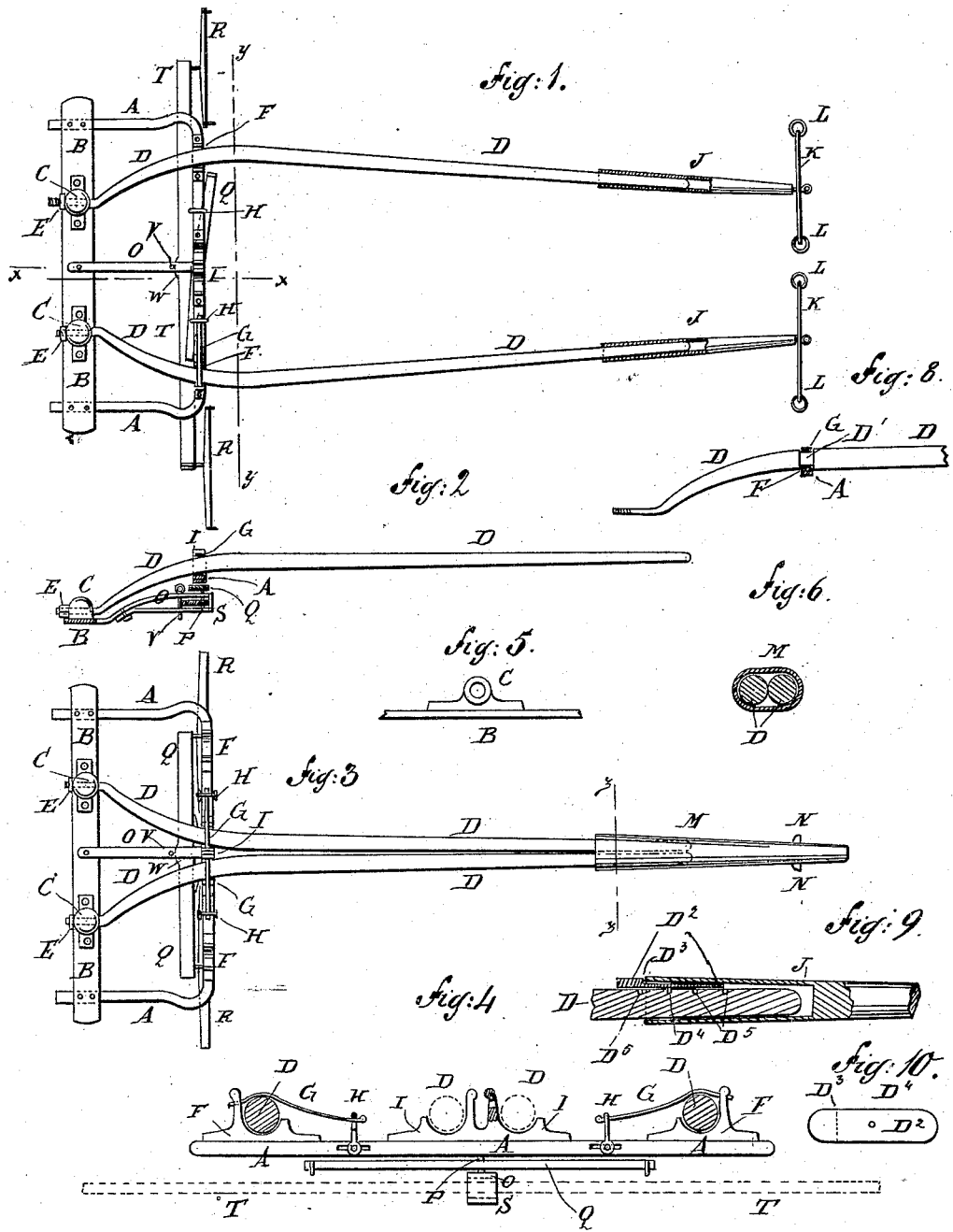
WITNESSES:
Chas. Nida
C. Sedgwick
INVENTOR:
J. Pettinger
BY
ATTORNEYS.

UNITED STATES PATENT OFFICE.

JOHN PETTINGER, OF CARPENTERIA, CALIFORNIA.

COMBINED SHAFTS AND POLE FOR VEHICLES.

SPECIFICATION forming part of Letters Patent No. 316,651, dated April 28, 1885.

Application filed July 25, 1884. (No model.)

*To all whom it may concern:*

Be it known that I, JOHN PETTINGER, of Carpenteria, in the county of Santa Barbara and State of California, have invented certain new and useful Improvements in a Combined Shafts and Pole, of which the following is a full, clear, and exact description.

Reference is to be had to the accompanying drawings, forming part of this specification, in which similar letters of reference indicate corresponding parts in all the figures.

Figure 1 is a plan view of my improvement shown as arranged for three horses, the thimbles being shown partly in section. Fig. 2 is a sectional side elevation of the same, taken through the line $x\,x$, Fig. 1. Fig. 3 is a plan view of the same, shown as arranged for two horses. Fig. 4 is a sectional front elevation of the same, taken through the line $y\,y$, Fig. 1. Fig. 5 is a front elevation of one of the thill-sockets. Fig. 6 is a sectional end elevation of the pole, taken through the line $z\,z$, Fig. 3. Fig. 7 is a plan view of the middle part of the long double-tree enlarged, and showing the fastening-pins in section. Fig. 8 represents the rear part of a grooved shaft, the saddle and fastening-spring being shown in section. Fig. 9 is a sectional elevation of a part of a shaft and thimble and of a holding-plate. Fig. 10 is an under side view of a single holding-plate.

The object of this invention is to facilitate the adjustment of vehicles for use with two or three horses.

The invention consists in a combined shafts and pole constructed with a bent bar or hounds provided with saddles to receive the shafts and fastening-springs and links to secure the shafts in place, a cross-bar provided with sockets to receive the ends of the shafts, and the shafts pivoted in the said sockets, whereby the said shafts, without being detached, can be arranged at such a distance from each other as to receive a horse between them, or close together to serve as a pole.

Upon the end of each shaft, when the shafts are arranged at a distance from each other, is placed an extension-thimble provided with a strap or neck-yoke to adapt the said shafts to be attached to three horses abreast.

Upon the ends of the two shafts, when arranged side by side, is placed a double thimble provided with lugs to adapt the said shafts to receive a neck-yoke ring.

To the centers of the bent bar or hounds and the cross-bar is attached a draw-bar provided with a socket and pins to adapt the shafts to receive a short double-tree, or both a short and a long double-tree, according as two or three horses are to be used, as will be hereinafter fully described.

A is a bent or U bar the ends of which are designed to be secured to the forward axle of the vehicle by thill-couplings or other suitable means. To the arms of the bent bar A, near their ends, are secured the ends of a cross-bar, B.

To the cross-bar B, upon the opposite sides of and equally distant from its center, are secured two sockets, C, in which are pivoted the rear ends of the shafts D. The shafts D are secured in place in the sockets C by nuts E, screwed upon the rear ends of the said shafts. The bends in the rear parts of the shafts D are such that when the concave sides of the said bends are toward each other, as shown in Fig. 1, the forward parts of the said shafts will be at a suitable distance apart to receive a horse between them, and when the convex sides of the said bends are toward each other, as shown in Fig. 3, the forward parts of the said shafts will be parallel with each other and close together to adapt them to serve as a pole.

To the transverse part of the bar A, near its bends, are attached two saddles, F, to receive the shafts D when arranged with their concave sides toward each other, and in which the said shafts are secured by the springs G, the outer ends of which are inserted in holes in the longer outer prongs of the said saddles, and their inner ends are secured in place by clevises or links H, hinged to the said bar A and swung over the ends of the said springs G, as shown in Fig. 4.

To the center of the transverse part of the bar A is secured a double saddle, I, to receive the shafts D when arranged with their convex sides toward each other, and where they are secured in place by the same springs G which are removed from the prongs of the saddles F, and are inserted in holes in the inner prongs of the double saddle I, and their free ends are secured by the same links H, as shown in Fig. 3.

When the shafts D are arranged for three horses, as shown in Fig. 1, an extension-thimble, J, is placed upon the forward end of each shaft to give the necessary length to the said shaft, which thimble has a strap, K, or a neck-yoke attached to its forward end, and provided with rings L, the inner ring being designed to receive the breast-strap of the center horse, and the outer ring being designed to receive the breast-strap of a side horse. When the shafts D are arranged for two horses, as shown in Fig. 3, a double thimble, M, is placed upon the forward ends of the two shafts to give the necessary length to the pole, which thimble is provided with lugs N, to serve as stops for the neck-yoke ring.

To the center of the cross-bar B is attached the rear end of the draw-bar O, to the upper side of the forward end of which and to the center of the bent bar A is pivoted, by a pin, P, the short double-tree Q, which serves as a whiffletree for the middle horse when three horses are to be used, as shown in Fig. 1.

In the forward end of the draw-bar O is formed a socket, S, to receive the long double-tree T, which is secured in place by the pin P, passing between the adjacent ends of two lugs or stops, U, attached to the forward edge of the said long double-tree T, and by the pin V, which passes through the draw-bar O at the rear side of the semicircular projection W, formed upon or attached to center of the rear edge of the said long double-tree T.

When two horses are to be used, the short double-tree Q can be secured in the socket S in the same manner as the long double-tree T, as shown in Fig. 3; or the short double-tree can be secured by the pin P, as before described. With this construction the shafts D can be easily and quickly adjusted to adapt them for use with two or three horses, as may be required.

The parts of the shafts D that rest in the saddles F F I can be provided with annular grooves D' for the said saddles and the springs G to rest in, as shown in Fig. 8, to hold the said shaft from longitudinal movement.

$D^2$ are plates placed upon the shafts D, and the forward parts of which enter the thimbles J. The plates $D^2$ are provided with shoulders $D^3$, for the edges of the thimble ends to rest against to hold the said thimbles from rearward movement. The plates $D^2$ are also provided with inwardly-projecting pins $D^4$, which enter holes $D^5$ in the shafts D to hold the said plate $D^2$ from slipping out of place. Several holes, $D^5$, are formed in each shaft D to receive the pins $D^4$, so that the plates $D^2$ and thimbles J can be adjusted forward or rearward as longer or shorter shafts may be required. In case the shafts D are adjusted close together to form a pole, a double holding-plate can be used, so that the said holding-plate and its dowel-pins will assist the thimble M in holding the said shafts from spreading. If desired, the links or clevises can be made to slide upon the bar A, so that longer springs G can be used than is possible when the said links are stationary.

Having thus described my invention, I claim as new and desire to secure by Letters Patent—

1. In a combined shafts and pole, the combination, with the bent bar or hounds A, of the saddles F I F, the fastening springs and links G H, the cross-bar B, provided with the sockets C, and the pivoted shafts D, substantially as herein shown and described.

2. In a combined shafts and pole, the combination, with the bent bar or hounds A and the shafts D, of the cross-bar B, the saddles F I, and the sockets C, substantially as herein shown and described, whereby the said shafts can be turned into a central or a side position, as set forth.

3. In a combined shafts and pole, the combination, with the bent bar or hounds A and the pivoted shafts D, of the central double saddle, I, the side saddles, F F, and the fastening springs and links G H, substantially as herein shown and described, whereby the said shafts can be firmly secured in either position, as set forth.

4. In a combined shafts and pole, the combination, with the bent bar or hounds A and the cross-bar B, of the draw-bar O, provided with the socket S and the pins P V, substantially as herein shown and described, whereby a short double-tree, or both a short and a long double-tree, can be applied, according as two or three horses are to be used, as set forth.

JOHN PETTINGER.

Witnesses:
W. H. WOODBRIDGE,
M. L. THORNTON.